(12) United States Patent
Baumecker et al.

(10) Patent No.: US 11,023,099 B2
(45) Date of Patent: Jun. 1, 2021

(54) IDENTIFICATION OF A SET OF OBJECTS BASED ON A FOCAL OBJECT

(71) Applicant: Micro Focus LLC, Santa Clara, CA (US)

(72) Inventors: Klaus Baumecker, Boeblingen (DE); Stefan Bergstein, Boeblingen (DE); Timo Schneller, Boeblingen (DE)

(73) Assignee: Micro Focus LLC, Santa Clara, CA (US)

( * ) Notice: Subject to any disclaimer, the term of this patent is extended or adjusted under 35 U.S.C. 154(b) by 386 days.

(21) Appl. No.: 15/534,281

(22) PCT Filed: Dec. 16, 2014

(86) PCT No.: PCT/US2014/070616
§ 371 (c)(1),
(2) Date: Jun. 8, 2017

(87) PCT Pub. No.: WO2016/099461
PCT Pub. Date: Jun. 23, 2016

(65) Prior Publication Data
US 2017/0329469 A1    Nov. 16, 2017

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0486* (2013.01); *G06F 3/04845* (2013.01); *G06F 16/38* (2019.01); *G06F 16/9562* (2019.01)

(58) Field of Classification Search
CPC .... G06F 3/0482; G06F 16/38; G06F 16/9562; G06F 3/04845; G06F 3/0486; G06F 16/95; G06F 16/90; G06F 16/958; G06F 3/03; G06F 3/03545; G06F 3/033; G06F 16/58; G06F 16/29; G06F 9/54; G06F 16/00; G06F 16/24578; G06F 16/248; H04L 49/90; Y10S 715/968
(Continued)

(56) References Cited

U.S. PATENT DOCUMENTS 8,553,981 B2    10/2013  Mei et al.
8,724,963 B2     5/2014  Bliss et al.
(Continued)

FOREIGN PATENT DOCUMENTS

WO    WO-2012058718         5/2012
WO    WO-2014042967 A1      3/2014

OTHER PUBLICATIONS

International Searching Authority, International Search Report and Written Opinion, dated Jun. 30, 2015, 12 pgs.
(Continued)

*Primary Examiner* — Alex Olshannikov

(57) ABSTRACT

In one implementation, a system for managing data includes a tag engine to maintain associations among objects of a data set, an associates engine to identify a first set of objects having a tag that matches a tag coupled to a focal object, a filter engine to identify a second set of objects based on the filter evaluated on the first set of objects, and a load engine to cause the second set of objects to load for display in a window of a UI.

20 Claims, 6 Drawing Sheets

(51) Int. Cl.
*G06F 16/955* (2019.01)
*G06F 16/38* (2019.01)
*G06F 3/0484* (2013.01)
*G06F 3/0486* (2013.01)

(58) Field of Classification Search
USPC .......................................................... 715/769
See application file for complete search history.

(56) References Cited

U.S. PATENT DOCUMENTS

| | | | |
|---|---|---|---|
| 9,720,965 B1* | 8/2017 | Miskie | G06F 16/24535 |
| 2006/0004734 A1* | 1/2006 | Malkin | G06F 16/957 |
| 2007/0220444 A1 | 9/2007 | Sunday et al. | |
| 2007/0300172 A1* | 12/2007 | Runge | G06Q 30/02 |
| | | | 715/764 |
| 2008/0115083 A1* | 5/2008 | Finkelstein | G06F 16/954 |
| | | | 715/805 |
| 2008/0229245 A1 | 9/2008 | Ulerich et al. | |
| 2009/0327963 A1 | 12/2009 | Mouilleseaux et al. | |
| 2012/0011470 A1* | 1/2012 | Oh | G06F 3/04883 |
| | | | 715/811 |
| 2012/0023449 A1* | 1/2012 | Zabielski | G06F 17/246 |
| | | | 715/825 |
| 2012/0038669 A1* | 2/2012 | Lee | G06F 3/011 |
| | | | 345/633 |
| 2012/0109986 A1 | 5/2012 | Palermiti, II | |
| 2012/0221567 A1 | 8/2012 | Finkelstein et al. | |
| 2013/0086522 A1 | 4/2013 | Shimazu | |
| 2013/0104079 A1 | 4/2013 | Yasui et al. | |
| 2013/0151666 A1 | 6/2013 | Hunter | |
| 2013/0166548 A1* | 6/2013 | Puzicha | G06F 16/93 |
| | | | 707/728 |
| 2013/0166550 A1 | 6/2013 | Buchmann et al. | |
| 2013/0346405 A1 | 12/2013 | Davis | |
| 2014/0075393 A1 | 3/2014 | Mei et al. | |
| 2014/0189559 A1 | 7/2014 | Bleizeffer et al. | |
| 2014/0195513 A1 | 7/2014 | Raichelgauz et al. | |
| 2014/0235354 A1* | 8/2014 | Takeuchi | H04L 41/06 |
| | | | 463/42 |
| 2014/0278556 A1 | 9/2014 | Goltra | |
| 2015/0113013 A1* | 4/2015 | Rys | G06F 16/24 |
| | | | 707/758 |
| 2016/0378318 A1* | 12/2016 | Tsuju | G06F 3/0488 |
| | | | 715/835 |

OTHER PUBLICATIONS

Jiang, et al. GestureQuery: A Multitouch Database Query Interface. Computer Science & Engineering Ohio State University. http://www.vldb.org/pyldb/vol6/p1342-nandi.pdf.

Lilong Jiang, et al., "GestureQuery: A Multitouch Database Query Interface," Proceedings of the VLDB Endowment, vol. 6, No. 12, 2013, 4 pages total.

Jenn K. Lee, "Review: iriver X20," Apr. 8, 2007, 20 pages total, http://www.pocketables.com/2007/04/review_iriver_x.html.

Sigalon's Mobile Soup, "LOOQS MeFrame WiFi photo frame packs Internet Radio, more," Dec. 15, 2009, 43 pages, http://sigalonmobile.soup.io/tag/wifi?since=38040581.

Posted by Ron Amadeo, "Stock Android Isn't Perfect," Feb. 7, 2013, 21 pages, http://www.androidpolice.com/2013/02/04/stock-android-isnt-perfect-jelly-bean-4-2-edition.

* cited by examiner

ID ENTIFICATION OF A SET OF OBJECTS BASED ON A FOCAL OBJECT

BACKGROUND

Data is ubiquitous. Data creation, storage, and analysis are common operations in information technology ("IT") industry and solutions for facilitating those operations are commonly developed for industry-specific or problem-specific purposes. For example, a database of IT service tickets can be maintained to discover common bugs in a system or a log of security alerts can be searched and/or analyzed to discover a system breach. Often, IT monitoring tools rely on strictly typed models that are populated with many details. One form of data consumption is through data exploration and/or navigation. For example, data sets may be presented in tabular form or aggregated as charts.

DETAILED DESCRIPTION

INTRODUCTION: In the following description and figures, some example implementations of systems and/or methods for managing data are described. A data management paradigm of the IT industry has shifted from "management by exception" to "collect everything and analyze on demand." Searching and browsing through large data sets can be ineffective due to the size of the data set and navigational functionality. The goal of assisting users to detect, identify, and resolve availably and performance issues of applications and IT infrastructures is constrained by user interface ("UI") workflows and unwanted data constraints.

Various examples described below relate to managing data in a semi-structured fashion to allow a user to walk through data based on tagged associations of data objects. By utilizing tags, data objects can be loaded for view and explored using gestures to find data objects associated with a designated focal object (i.e., an object designated as the focus of exploration). Gestures can allow for a user to observe a window of associated data objects and change the presented data by using a filter of tags and/or changing the focal object. In this manner, a user can effectively traverse large data sets in an intuitive and flexible form.

The following description is broken into sections. The first, labeled "Components," describes examples of physical and logical components for implementing various embodiments. The second, labeled "Environment," describes an example of a network environment in which various embodiments may be implemented. The third section, labeled "Operation," describes steps taken to implement various embodiments.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, manage, and/or modify."

Figure 1:
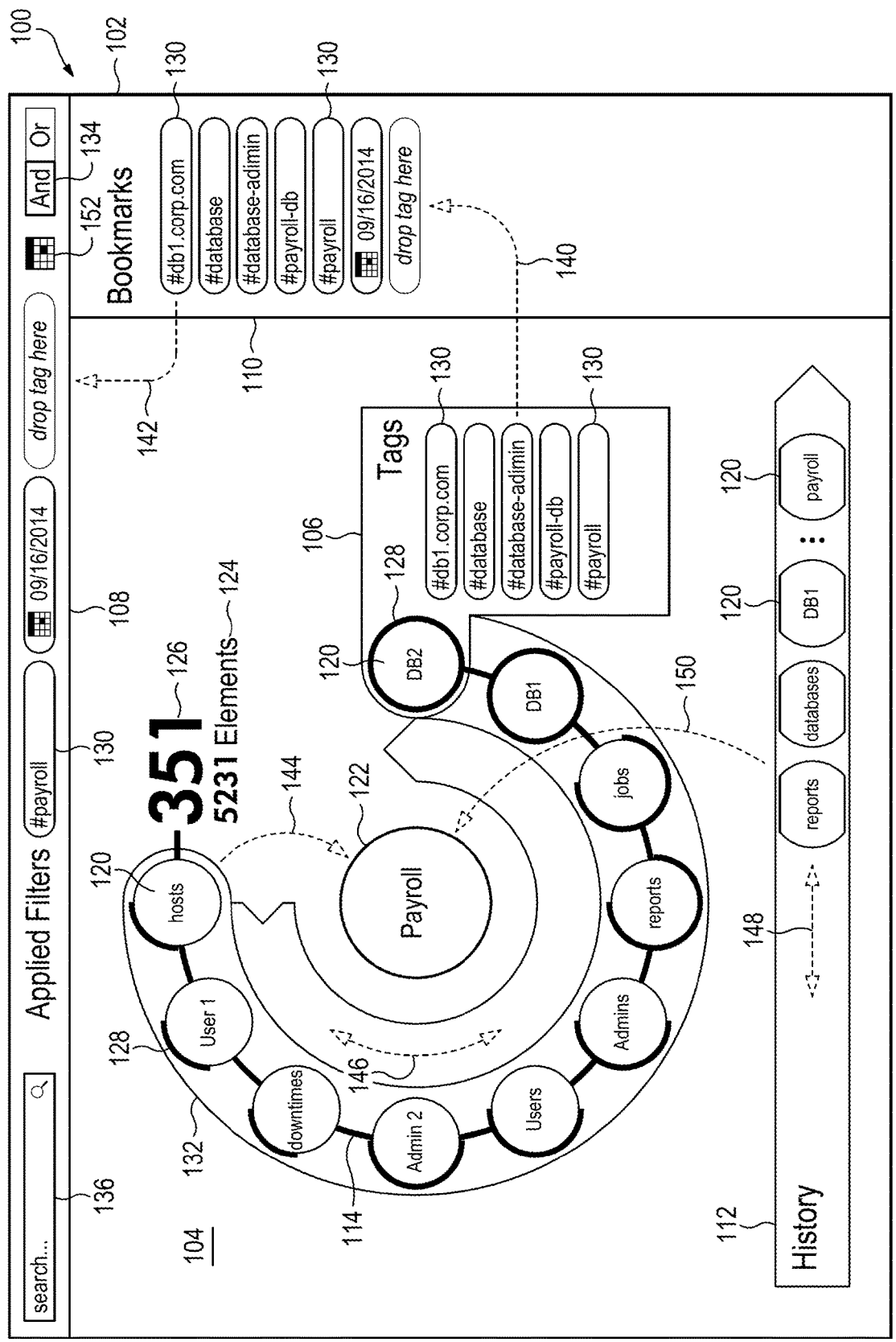
FIG. 1 depicts an example user interface ("UI") in which various systems for managing data can be implemented.

COMPONENTS: FIG. 1 depicts an example UI 102 in which various systems 100 for managing data can be implemented. The example UI 102 is a graphical UI that provides visual representations of functionalities to allow a user to explore a large data set with the ease of changing what part of the data set is being observed at any given time using gestures.

The example UI 102 of FIG. 1 is organized into five main areas. The first area 104 (the area of the UI 102 for traversing the data set) displays a portion of a data set as objects 120 where one object is the focal object associated with the displayed objects as designated at the focal object location 122. The first area 104 can include an indication of the total number 124 of elements associated with the focal object and an indication of the position 126 of the objects currently visible in the first area 104. The objects 120 can be moved within the window 132 to show more elements of the results that are hidden from view as indicated by the total number 124 and the position 126, such as by using a clockwise or counterclockwise gesture 146. In some examples, the outline of the window 132 may not be visible. In some examples, the objects 120 that are associated with the focal object at location 122 can follow a reference arc 114 (which may or may not be visible). The reference arc 114 represents an expected path and/or positions of the objects 120 being made visible at any given time. Limiting the visibility of the data set aids the user in consuming the information of the data set as well as the ability to move objects 120 in and out of the window 132.

Each object 120 is associated with at least one tag 130. For example, the object detail area 106 displays the tags 130 associated with one of the objects 120. The tags 130 can be used to determine the results shown in the window 132. In particular, tags 130 can be added to a filter on the objects 120 associated with the focal object. For example, a user can select the calendar icon 152 to create a tag associated with a time period to filter the objects in the window to objects that have been updated during the specified time period. The applied filters area 108 displays the tags 130 of the filter. The tags 130 of the filter can be joined to narrow or broaden the results based on the toggle 134. Tags 130 that are used often, or otherwise may want to be remembered, can be saved into the bookmark area 110 that displays a list of saved tags. For example, a user can use the gesture 140 to move a tag 130 of an object from the object detail area 106 to the bookmark area 110. When the tag 130 of the object 120 is desired to be used in the filter, the tag 130 can be dragged directly from the object details area 106 or from the bookmark area 110 to the applied filters area 108 (e.g., using gesture 142). The indicator 128 associated with each visible object 120 can indicate how well the object 120 matches the filter.

The focal object can be searched for in the data set based on initialization parameters from the system 100, using the search box 136, or by pulling an object 120 from the window 132 to the focal object location 122 (e.g., using the gesture 144). A history of which objects 120 have been in the focal object location 122 are displayed in the history area 112. The history of the focal objects can be traversed (such as by using gesture 148) and a former focal object can be returned to the focal object location 122 by using a gesture 150 to select a former focal object 120 and dragging the former focal object 120 to the focal object location 122. The above collection of functionalities offered by the UI can provide flexible ability to traverse large data sets in a manner intuitive to the user.

Figure 2:
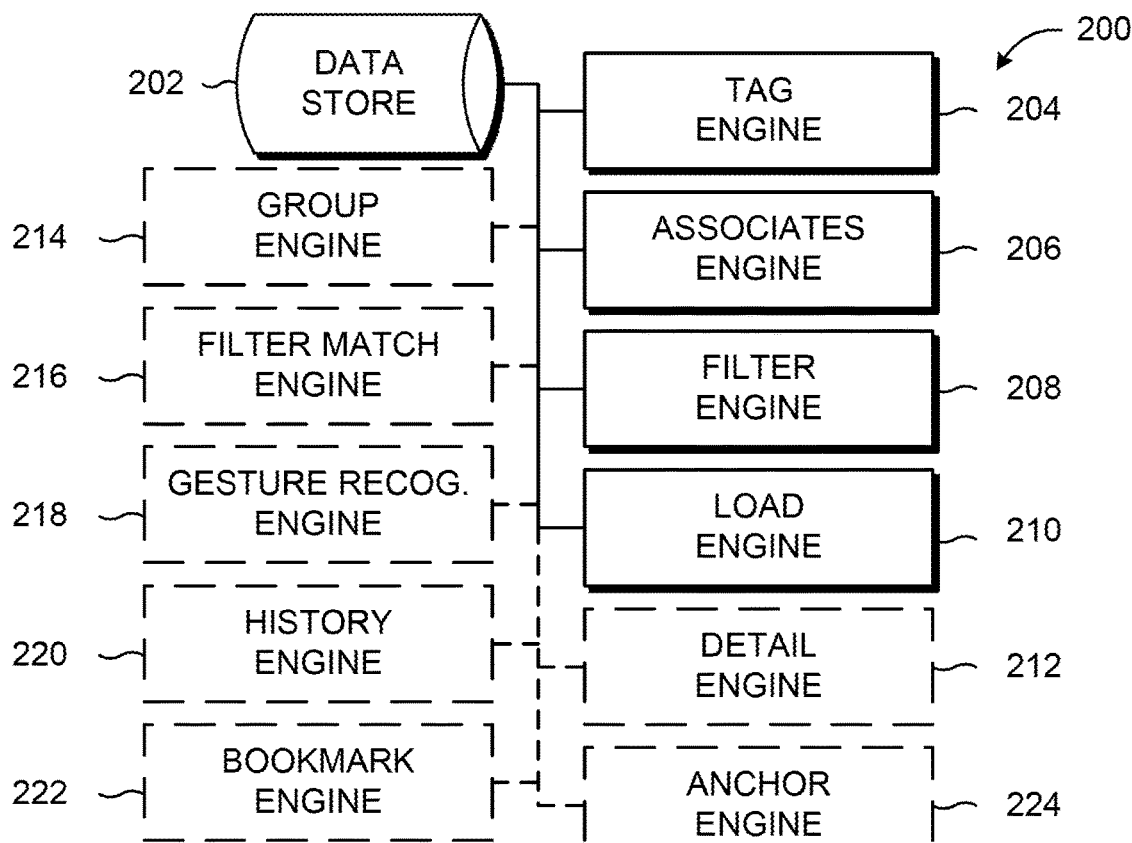
FIGS. 2 and 3 are block diagrams depicting example systems for managing data.
Figure 3:
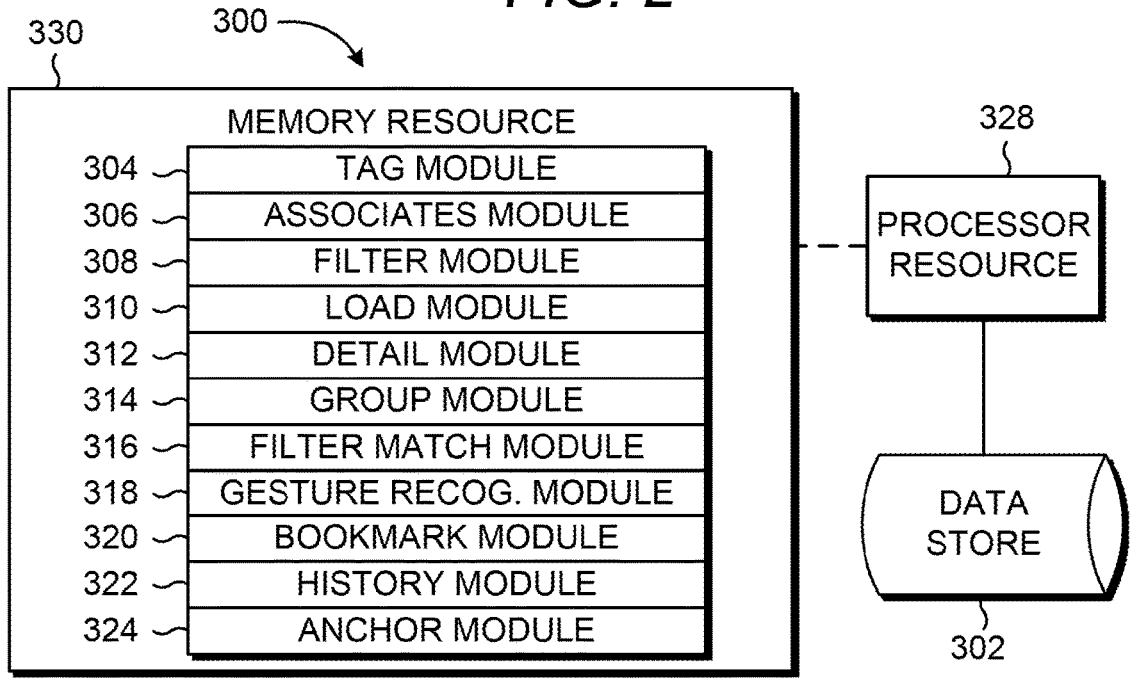

FIGS. 2 and 3 are block diagrams depicting example systems 200 and 300 for managing data. Referring to FIG. 2, the example system 200 of FIG. 2 generally includes a data store 202, a tag engine 204, an associates engine 206, a filter engine 208, and a load engine 210. In general, the load engine 210 can provide objects associated with a focal object determined by the associates engine 206 and the filter engine 210 utilizing tags maintained by the tag engine 204 to associate objects of a data set. The example system 200 can include a filter match engine 216, a group engine 214, a detail engine 212, a gesture recognition engine 218, a bookmark engine 220, a history engine 222, and an anchor engine 224. In general, the engines 204-224 can facilitate exploration of a data set comprising objects capable of being tagged to represent associations with other objects of the data set.

The system 200 is useful to explore large data set and can be applied to large data sets that are semi-structured. For example, the partial structure of a data set can be a label associated with an attribute of the object or a pointer reference from one object to another. The partial structure, as discussed herein, is represented as tags that are coupled to objects of the data set. The tags represent associations of the data set. For example, the associations can be relationships, commonalities, attributes, designations, etc. that are able to be represented by tags. The tags are to be coupled with objects. For example, each object of a particular type can be tagged with a tag associated with designating the object type and each object created at a particular time may have a creation time-stamp tag that represents the date of creation of the object. Tags may be represented in any appropriate form such as a number, a value, a character, a string, a category, an icon, an image, or other identifier.

Referring to FIG. 2, the tag engine 204 represents any circuitry or combination of circuitry and executable instructions to maintain associations among objects of a data set. The associations between objects can be explicit or implicit correlations among objects of the data sets. The associations can be determined and/or designated manually or automatically. The tag engine 204 can assist in maintaining the semi-structure of the data set to allow for the data set to be explored.

The semi-structured data set can be represented as a graph, where each object is represented as a node and each node can be connected by an edge to another node when both nodes are coupled with the same tag. The tag engine 204 can include circuitry or a combination of circuitry and executable instructions to generate a graph of the objects of the data set based on the tags. The graph can be a loosely-coupled graph where edges are created between objects based on associations (represented by tags) as the associations arise or as the objects are requested from the system 200. For example, data objects used by a particular user set may be connected to one another. For another example, data objects that are sub-objects or descendants of an object class may be connected to one another. Tags can be manually created to assist business analysis and the loose-coupling allows for changes to data objects to be found through chains of objects connected to one another. In this manner, a user may be able to "walk" (e.g., traverse) from one data object to another (e.g., a path comprising nodes and edges of the graph) based on tags at each object.

Exploration of the data set is assisted by identifying related objects. For example, if there is an error associated with a function (represented as an object), the error could be in the underlying data or sub-functions of the function, where the underlying data and sub-functions are represented as objects in the data set. When a data object is selected for exploration, the object is designated as the focal object. The objects associated with the focal objects are determined by the associates engine 206.

The associates engine 206 represents any circuitry or combination of circuitry and executable instructions to identify a first set of the objects having a first tag that matches a second tag coupled to the focal object. For example with reference to FIG. 1, a first object of the objects of the data set can be designated as the focal object by pulling an object to the focal object location 122, and the window 132 can be filled with a first set of objects that are directly related to the focal object (i.e., the first set of objects are a subset of the data set that are coupled with a tag that is coupled to the focal object). The associates engine 206 can obtain an object identifier associated with the focal object and utilize the object identifier to discover objects that are directly related based on object identifiers that are associated with the same tag(s) as the object identifier of the focal object.

The filter engine 208 represents any circuitry or combination of circuitry and executable instructions to identify a set of objects based on a filter. A filter comprises a number of tags and the tags of the filter can be compared to the tags coupled to the objects of the data set. For example, a filter can at least include a tag of the focal object. For another example, a filter can include multiple associations that are taggable in the system 200, such as a data type, a pointer reference, or a time period. For example, a system log data set can assist in determining a problem discovered on a certain day, by filtering the objects associated with the focal object to only show data objects modified within 24 hours prior to the discovery of the problem.

The filter can be maintained by the filter engine 208 to change the scope of the relations to the focal object. For example, the resulting data set of the filter can be narrowed by adding another tag to the filter. The number of tags of the filter are maintainable based on gesture input, such as gesture input representing a change in a location of one of the number of tags on a UI. For example, a gesture to drag-and-drop a tag from one area of the UI to another area can move a tag in or out of the filter. The system 200 can provide for automatic refreshing of the resulting objects in the results window based on changes to the filter or focal object. For example, the filter engine 208 can initiate a narrowing of objects identified as associated with the focal object when a tag is added to the filter based on a drag-and-drop gesture of a tag on to the applied filter area. In general, the filter engine 208 can identify a second set of objects based on the filter evaluated on the first set of objects identified by the associated engine 206.

The filter engine 208 can also maintain whether a plurality of tags of the filter are to broaden or narrow the data based on the relationship of the tags. The relationship between the tags can be automatically determined or manually selected by a user. For example, the filter may narrow the results to an intersection of results from a first group of objects coupled to a first tag and a second group of objects coupled to a second tag. For another example, the filter may provide results to a union of a first group of objects coupled to a first tag and a second group of objects coupled to a second tag. In this manner, the relationship between the tags (i.e., whether an intersection or a union) can produce various results for view by the user.

The load engine 210 represents any circuitry or combination of circuitry and executable instructions to cause the set of the objects to load for display in a window of the UI. For example, the load engine 210 can designate the identified set of objects to be loaded for display and prepare, at a data server (e.g., service device 434 of FIG. 4), to transmit a subset of an identified set of objects located in a data store (such as data store 202) that are associated with the focal object to a client device, such as a user device 436 of FIG. 4.

The load engine 210 can cause a different set of objects to load based on how the data is explored. For example, the load engine 210 can cause a different set of objects to load in a results window based on at least one of a change of the focal object (e.g., pulling a different object to the focal object location) and a change of the filter (e.g., removing or adding a tag to the filter).

The detail engine 212 represents any circuitry or combination of circuitry and executable instructions to maintain a list of tags coupled with each object. For example, the data structure representing an object can contain an array allocated to store the tags associated with the object. An object can be coupled to multiple tags directly and/or indirectly. For example, an object may not contain an explicit timestamp tag, but a tag applied to a certain time may identify the object based on metadata, such as the creation date or modification date of the object. For another example, the types of data of the object may be associated with multiple tables (or other data organization structures) and, therefore, the object can be respectively coupled with a tag for each table. The tags associated with each object can be presented to a user to assist the user in finding other related objects. The detail engine 212 can also represent any circuitry or combination of circuitry and executable instructions to cause the details of the object (e.g. the tags coupled to the object) to be displayed based on the position of the object in the results window. For example, the detail engine 212 can track a position of an object in the results window and a particular position in the results window may be designated as the detail position where the details of an object in that position may be displayed in a details area of the UI.

The group engine 214 represents any circuitry or combination of circuitry and executable instructions to maintain host objects to represent groups of objects. For example, the group engine 214 can represent a combination of circuitry and executable instructions to determine whether a number of objects associated with a particular tag achieves a group threshold (i.e., a minimum number of objects to form a group) and, in response to the group threshold being achieved, create a dummy object coupled with the particular tag. In that example, a node can be created in a graph representing the data set and connections from the new node can be made to each of the objects of the group. In that manner, the number of objects are identified by the associates engine 404 when the dummy object is designated as the focal object.

The filter match engine 216 represents any circuitry or combination of circuitry and executable instructions to maintain a degree of conformity to a filter for each object. For example, a filter may contain multiple tags (e.g., likely a subset of all the tags associated with a data set) and a few objects of the data set may contain all the tags of the filter, but objects that include less than all the tags may still be relevant to the data exploration session. As such, a degree of conformity (e.g., the closeness or "best match" to the filter) can be determined (e.g., calculated based on a comparison of tags of an object to tags of the filter) and made presentable to the user on the subset of objects visible on the UI. The degree of conformity can be represented in any appropriate form, such as a number, a value, a character, a string, a category, or other identifier.

The gesture recognition engine 218 represents any circuitry or combination of circuitry and executable instructions to identify gestures performed on the UI. A gesture can be identified based on the location of input and action represented by the input. For example, the location of the input can be an area of the UI and an action can be a double-click on the area. Such input can be provided from a touch screen or a peripheral device, such as a computer mouse or motion detection system.

Gestures can include any appropriate form of interaction with a UI. For example, a gesture can be a drag-and-drop gesture to move an element of the UI to a different location, a double-tap gesture to select an element of the UI, a click-and-hold gesture to select an element of the UI, a rotational gesture to move an element of the UI in a circular direction or make a selection from a list, etc. For another example, a gesture along the path of the reference arc (e.g., reference arc 114 of FIG. 1) can change the subset of objects displayed in the results window (e.g., move objects in from one side or the other until an end of the results is reached). Gestures can represent selection of a UI element, movement within a list, movement from one location to another, modification of an attribute, or other capabilities associated with data exploration.

The bookmark engine 220 represents any circuitry or combination of circuitry and executable instructions to maintain a list of tags designated as saved for potential use with the filter. For example, a data object may contain two tags, where the first tag can be sent to the filter to see more objects related to that tag and the second tag can be bookmarked (i.e., saved) to allow the user to come back to that tag to explore at a later time.

The history engine 222 represents any circuitry or combination of circuitry and executable instructions to maintain a log of objects that have been designated as the focal object in a data exploration session. For example, a user may begin to explore a path through the graph of the data set and then return back to a node in the graph by selecting a list of objects that have previously been selected to be the focal object.

The anchor engine 224 represents any circuitry or combination of circuitry and executable instructions to designate an object of the data set as the focal object. The focal object can be designated in a number of ways. For example, a link of an IT ticket may be clicked to search through the data set related to the ticket and the information of the ticket can be used by a mechanism designated by the ticket system to determine the focal object and that designation can be sent to the system 200 via an application programming interface ("API"). The anchor engine 224 can maintain the changes in the focal object during a data exploration session. For example, the anchor engine 224 can be a combination of circuitry and executable instructions to maintain the focal object based on at least one of a first gesture that represents selection of an object from the results window or history area as the focal object and a search instruction that represents a retrieval of the focal object form the data set based on a text entry.

The data store 202 can contain information utilized by the engines 204-224. For example, the data store 202 can store the data set, a tag, a filter, a graph, a log of the history of the focal objects, gesture information, etc.

FIG. 3 depicts the example system 300 can comprise a memory resource 330 operatively coupled to a processor resource 328. The processor resource 328 can be operatively coupled to a data store 302. The data store 302 can be the same as the data store 202 of FIG. 2.

Referring to FIG. 3, the memory resource 330 can contain a set of instructions that are executable by the processor resource 328. The set of instructions are operable to cause the processor resource 328 to perform operations of the system 300 when the set of instructions are executed by the processor resource 328. The set of instructions stored on the memory resource 330 can be represented as a tag module 304, an associates module 306, a filter module 308, a load module 310, a detail module 312, a group module 314, a filter match module 316, a gesture recognition module 318, a bookmark module 320, a history module 322, and an anchor module 324. The modules 304-324 represent program instructions that, when executed, function as the tag engine 204, the associates engine 206, the load engine 208, the filter engine 210, the detail engine 212, the group engine 214, the filter match engine 216, the gesture recognition engine 218, the bookmark engine 220, the history engine 222, and the anchor engine 224 of FIG. 2, respectively. The processor resource 328 can carry out a set of instructions to execute the modules 304-324, and/or any other appropriate operations among and/or associated with the modules of the system 300. For example, the processor resource 328 can carry out a set of instructions to designate a focal object (e.g., based on at least one of a gesture, an API input, and a text input), identify a set of objects related to the focal object based on a filter applied to the focal object, load the set of objects from a data store 302, and designate a subset of the set of objects to cause to be presented in a window of a UI. For another example, the processor resource 328 can carry out a set of instructions to track a position of a first object of the subset of the set of objects displayed in the results window and change the subset of visible objects based on at least one of a gesture performed on an area of the UI associated with the results window, a gesture to change the focal object, or a gesture to update the filter. For yet another example, the processor resource 328 can carry out a set of instructions to maintain a plurality of tags among the objects of the data set, generate a graph of the objects of the data set based on the tags, generate a dummy object based on a number of objects to achieve a group threshold, and cause the number of objects to load for display when the dummy object is designated as the focal object because the dummy object represents a parent node having the number of objects as descendants (e.g., related nodes from the selected parent node).

Figure 5:
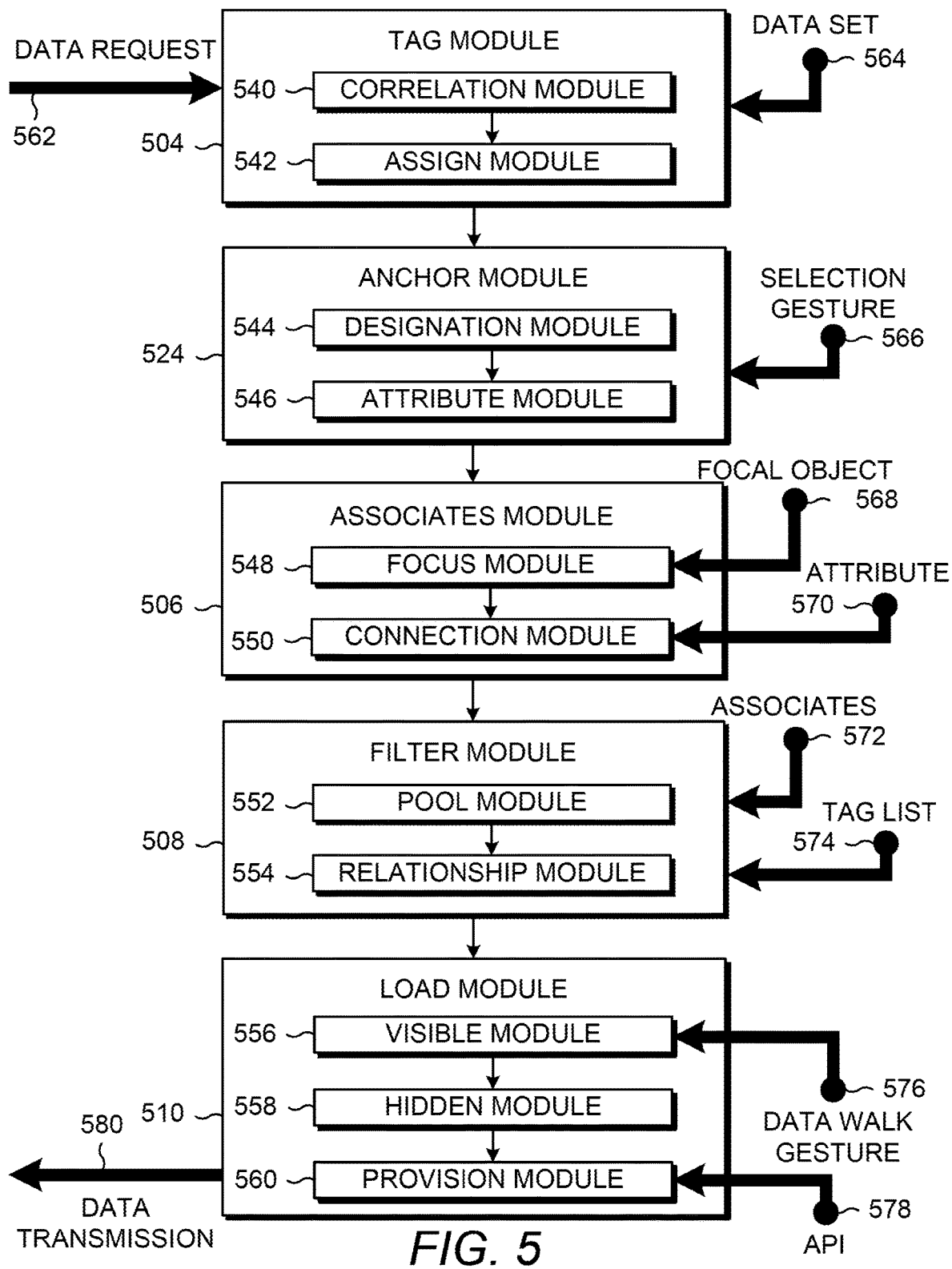
FIG. 5 depicts example modules used to implement example systems for managing data.

Although these particular modules and various other modules are illustrated and discussed in relation to FIG. 3 and other example implementations, other combinations or sub-combinations of modules can be included within other implementations. Said differently, although the modules illustrated in FIG. 3 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIG. 5 depicts yet another example of how functionality can be organized into modules.

The processor resource 328 can be any appropriate circuitry capable of processing (e.g., computing) instructions, such as one or multiple processing elements capable of retrieving instructions from the memory resource 330 and executing those instructions. For example, the processor resource 328 can be a central processing unit ("CPU") that enables data management by fetching, decoding, and executing modules 304-324. Example processor resources 328 include at least one CPU, a semiconductor-based microprocessor, an application specific integrated circuit ("ASIC"), a field-programmable gate array ("FPGA"), and the like. The processor resource 328 can include multiple processing elements that are integrated in a single device or distributed across devices. The processor resource 328 can process the instructions serially, concurrently, or in partial concurrence.

The memory resource 330 and the data store 302 represent a medium to store data utilized and/or produced by the system 300. The medium can be any non-transitory medium or combination of non-transitory mediums able to electronically store data, such as modules of the system 300 and/or data used by the system 300. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. The memory resource 330 can be said to store program instructions that when executed by the processor resource 328 cause the processor resource 328 to implement functionality of the system 300 of FIG. 3. The memory resource 330 can be integrated in the same device as the processor resource 328 or it can be separate but accessible to that device and the processor resource 328. The memory resource 330 can be distributed across devices. The memory resource 330 and the data store 302 can represent the same physical medium or separate physical mediums. The data of the data store 302 can include representations of data and/or information mentioned herein.

In the discussion herein, the engines 204-224 of FIG. 2 and the modules 304-324 of FIG. 3 have been described as circuitry or a combination of circuitry and executable instructions. Such components can be implemented in a number of fashions. Looking at FIG. 3, the executable instructions can be processor-executable instructions, such as program instructions, stored on the memory resource 330, which is a tangible, non-transitory computer-readable storage medium, and the circuitry can be electronic circuitry, such as processor resource 328, for executing those instructions. The instructions residing on the memory resource 330 can comprise any set of instructions to be executed directly (such as machine code) or indirectly (such as a script) by the processor resource 328.

In some examples, the system 300 can include the executable instructions can be part of an installation package that when installed can be executed by the processor resource 328 to perform operations of the system 300, such as methods described with regards to FIGS. 5-8. In that example, the memory resource 330 can be a portable medium such as a compact disc, a digital video disc, a flash drive, or memory maintained by a computer device, such as a service device 434 of FIG. 4, from which the installation package can be downloaded and installed. In another example, the executable instructions can be part of an application or applications already installed. The memory resource 330 can be a non-volatile memory resource such as read only memory ("ROM"), a volatile memory resource such as random access memory ("RAM"), a storage device, or a combination thereof. Example forms of a memory resource 330 include static RAM ("SRAM"), dynamic RAM ("DRAM"), electrically erasable programmable ROM ("EEPROM"), flash memory, or the like. The memory resource 330 can include integrated memory such as a hard drive ("HD"), a solid state drive ("SSD"), or an optical drive.

Figure 4:
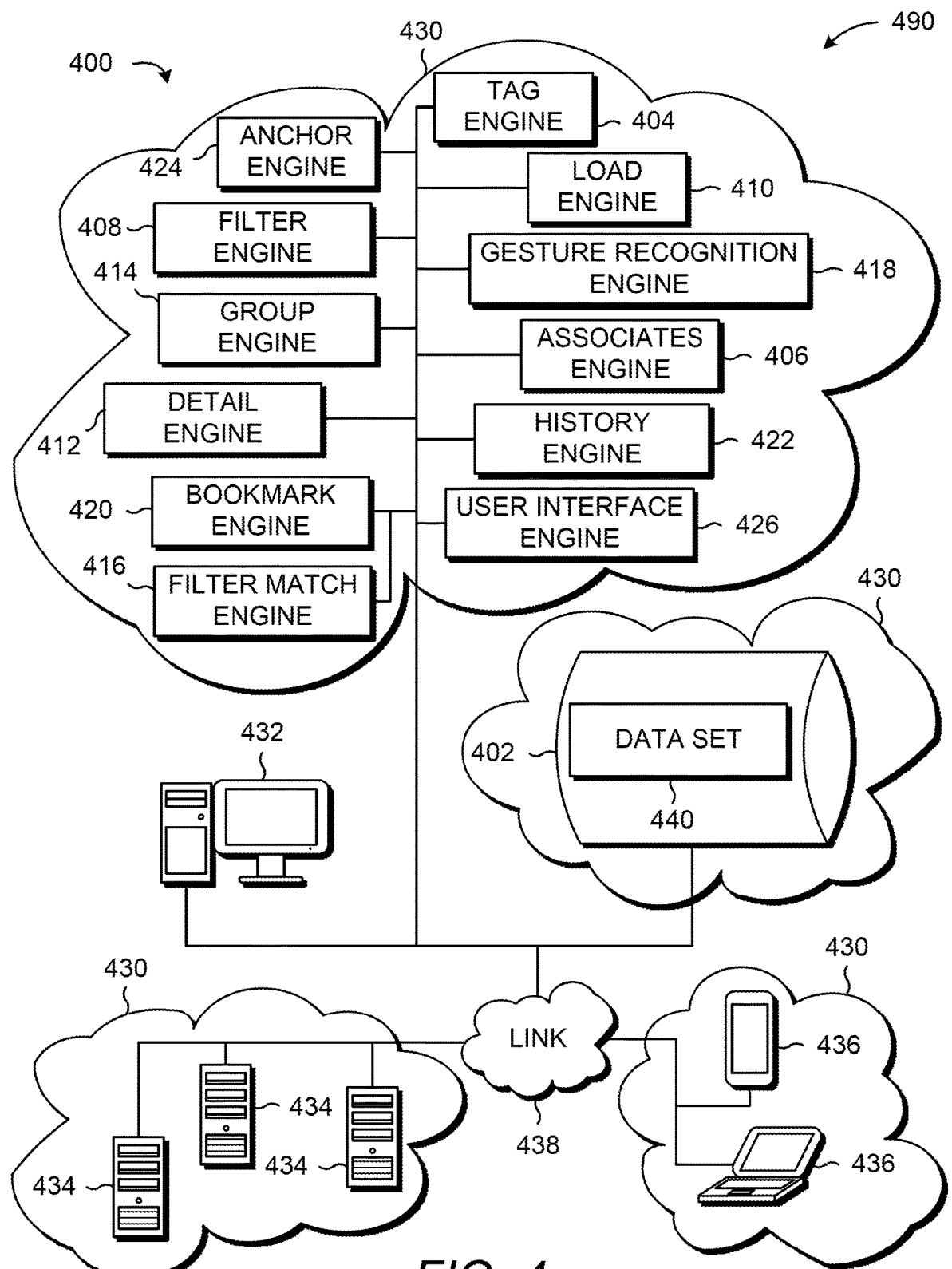
FIG. 4 depicts an example environment in which various systems for managing data can be implemented.

ENVIRONMENT: FIG. 4 depicts example environments in which various example systems 400 can be implemented. The example environment 490 is shown to include an example system 400 for managing data. The system 400 (described herein with respect to FIGS. 2 and 3) can represent generally any circuitry or combination of circuitry and executable instructions to manage a data set. The system 400 can include a tag engine 404, an associates engine 406, a filter engine 408, a load engine 410, a detail engine 412, a group engine 414, a filter match engine 416, a gesture recognition engine 418, a bookmark engine 420, a history engine 422, and an anchor engine 424 that are the same as the tag engine 204, the associates engine 206, the filter engine 208, the load engine 210, the detail engine 212, the group engine 214, the filter match engine 216, the gesture recognition engine 218, the bookmark engine 220, the history engine 222, and the anchor engine 224 of FIG. 2, respectively, and the associated descriptions are not repeated for brevity. The system 400 can also include a UI engine 426 representing any circuitry or combination of circuitry and executable instructions to communicate information from the system 400 to the UI, such as the UI presented via a browser on a user device 436. As shown in FIG. 4, the engines 404-426 can be integrated into a compute, such as a service device. The engines 404-426 can be integrated via circuitry or as installed instructions into a memory resource of the compute.

The example environment 490 can include compute devices, such as developer devices 432, service devices 434, and user devices 436. A first set of instructions can be developed and/or modified on a developer device 432 and associated with a data set 440 of objects. For example, an application can be developed and modified on a developer device 432 and stored onto a web server, such as a service device 434, and the data set 440 associated with the application can be stored in a data store 402 on a data server, such as a service device 434. The service devices 434 represent generally any compute devices to respond to a network request received from a user device 436, whether virtual or real. For example, the service device 434 can operate a combination of circuitry and executable instructions to provide a network packet in response to a request for a page or functionality of an application. The user devices 436 represent generally any compute devices to communicate a network request and receive and/or process the corresponding responses. For example, a browser application may be installed on the user device 436 to receive the network packet from the service device 434 and utilize the payload of the packet to display an element of a page via the browser application.

The compute devices can be located on separate networks 430 or part of the same network 430. The example environment 490 can include any appropriate number of networks 430 and any number of the networks 430 can include a cloud compute environment. A cloud compute environment may include a virtual shared pool of compute resources. For example, networks 430 can be distributed networks comprising virtual computing resources. Any appropriate combination of the system 400 and compute devices can be a virtual instance of a resource of a virtual shared pool of resources. The engines and/or modules of the system 400 herein can reside and/or execute "on the cloud" (e.g. reside and/or execute on a virtual shared pool of resources).

A link 438 generally represents one or a combination of a cable, wireless connection, fiber optic connection, or remote connections via a telecommunications link, an infrared link, a radio frequency link, or any other connectors of systems that provide electronic communication. The link 438 can include, at least in part, intranet, the Internet, or a combination of both. The link 438 can also include intermediate proxies, routers, switches, load balancers, and the like.

Referring to FIGS. 2-4, the engines 204-224 of FIG. 2 and/or the modules 304-324 of FIG. 3 can be distributed across devices 432, 434, 436, or a combination thereof. The engines and/or modules can complete or assist completion of operations performed in describing another engine and/or module. For example, the associates engine 406 of FIG. 4 can request, complete, or perform the methods or operations described with the associates engine 206 of FIG. 2 as well as the tag engine 204, the filter engine 208, and the load engine 210 of FIG. 2. Thus, although the various engines and modules are shown as separate engines in FIGS. 2 and 3, in other implementations, the functionality of multiple engines and/or modules may be implemented as a single engine and/or module or divided in a variety of engines and/or modules. In some example, the engines of the system 400 can perform example methods described in connection with FIGS. 5-8.

OPERATION: FIG. 5 depicts example modules used to implement example systems for data management. Referring to FIG. 5, the example modules of FIG. 5 generally include a tag module 504, an anchor module 524, an associates module 506, a filter module 508, and a load module 510. The example modules of FIG. 5 can be implemented on a compute device, such as a service device 434.

A data request 562 can be received and queued by the system and cause the data set 564 to be retrieved. The tag module 504 represents program instructions that when executed by a processor resource cause the data set 564 to be maintained with tags coupled to objects of the data set 564. The tag module 504 can include program instructions, such as a correlation module 540 and an assign module 542, to assist in maintaining the data set 564. For example, the correlation module 540 can represent program instructions that, when executed, cause a processor resource to identify a relationship between two data objects of the data set 564 and the assign module 542 can represent program instructions that, when executed, cause the processor resource to assign a tag to each object associated with the relationship.

The data request 562 can cause an anchor module 524 to execute and, in turn, cause a processor resource to appoint (e.g., designate) a focal object based on a selection gesture 566. The anchor module 524 can include program instructions, such as a designation module 544 and an attribute module 546, to assist in appointing the focal object. For example, the designation module 544, when executed, can cause a processor resource to identify the object to be designated as the focal object, such as by setting a flag of an object based on the selection gesture 566. For another example, the attribute module 546, when executed, can cause a processor resource to identify an attribute 570 of the object designated by the selection gesture 566. The identified attribute 570 can be used by a processor resource executing the associates module 506 to produce a number of results (e.g., a set of objects of the data set related to the focal object based on the attribute 570). The associates module 506 can include program instructions, such as a focus module and a connection module 550, to assist in identifying associates of the focal object 568. For example, the focus module 548, when executed, can cause a processor resource to search for a node of a graph associated with the focal object 568 and the connection module 550, when executed, can cause a processor resource to follow an edge of the graph associated with the attribute 570 to another node. The related node can be added to a list of results to potentially load and cause to be presented via a UI.

The filter module 508 can include program instructions, such as a pool module 552 and a relationship module 554, to assist in filtering the objects identified (i.e., the associate objects 572) by the processor resource executing the associates module. For example, the pool module 552, when executed, can cause a processor resource to identify the tags of the associates 572, and the relationship module 554, when executed, can identify which tags are also located within the tag list 574 of the filter and filter relationship (e.g., whether the tag list 574 are joined as a union or intersection) and, based on the comparison of each associated tag set to the tag list 574, determine a subset of the set of associates that fit the filter.

The load module 510 can include program instructions (such as a visible module 556, a hidden module 558, and a provision module 560) to prepare the filtered associates. For example, the visible module 556 represents program instructions that when executed cause a processor resource to designate which subset of the associates are to be visible on the UI based on a data walk gesture 576. A data walk gesture 576 represents the input that causes an instruction of traversing the data to identify a different subset to view on the UI. For another example, the hidden module 558 represents program instructions that when executed cause a processor resource to track which objects are to be hidden from view on the UI (i.e., hidden from presentation but still load the objects for potential view by the user based on the data walk gesture 576). For yet another example, the provision module 560 represents program instructions that when executed cause a processor resource to prepare a data transmission 580 (i.e., prepare data packets) to a user device (such as user device 436 of FIG. 4) based on an API 578 for interacting with the UI (i.e., interacting with the browser on the user device).

Figure 6:
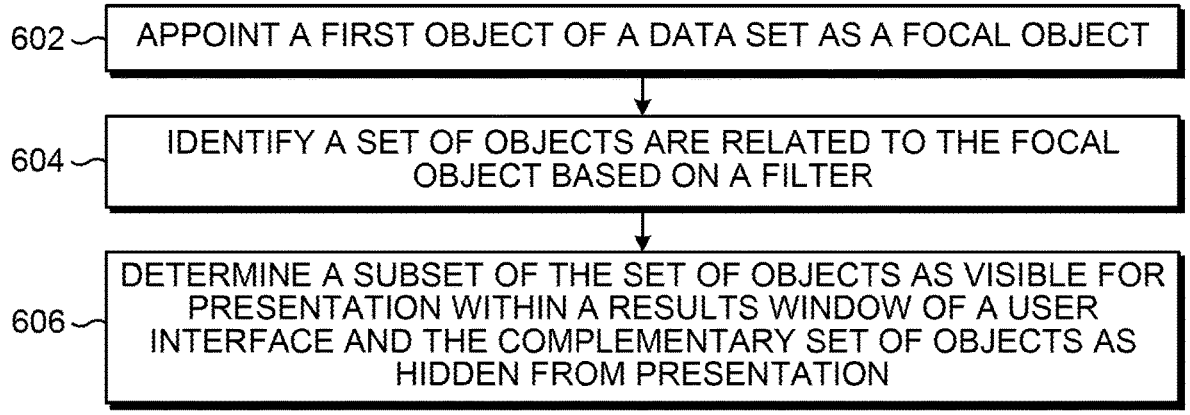
FIGS. 6-8 are flow diagrams depicting example methods for managing data.
Figure 7:
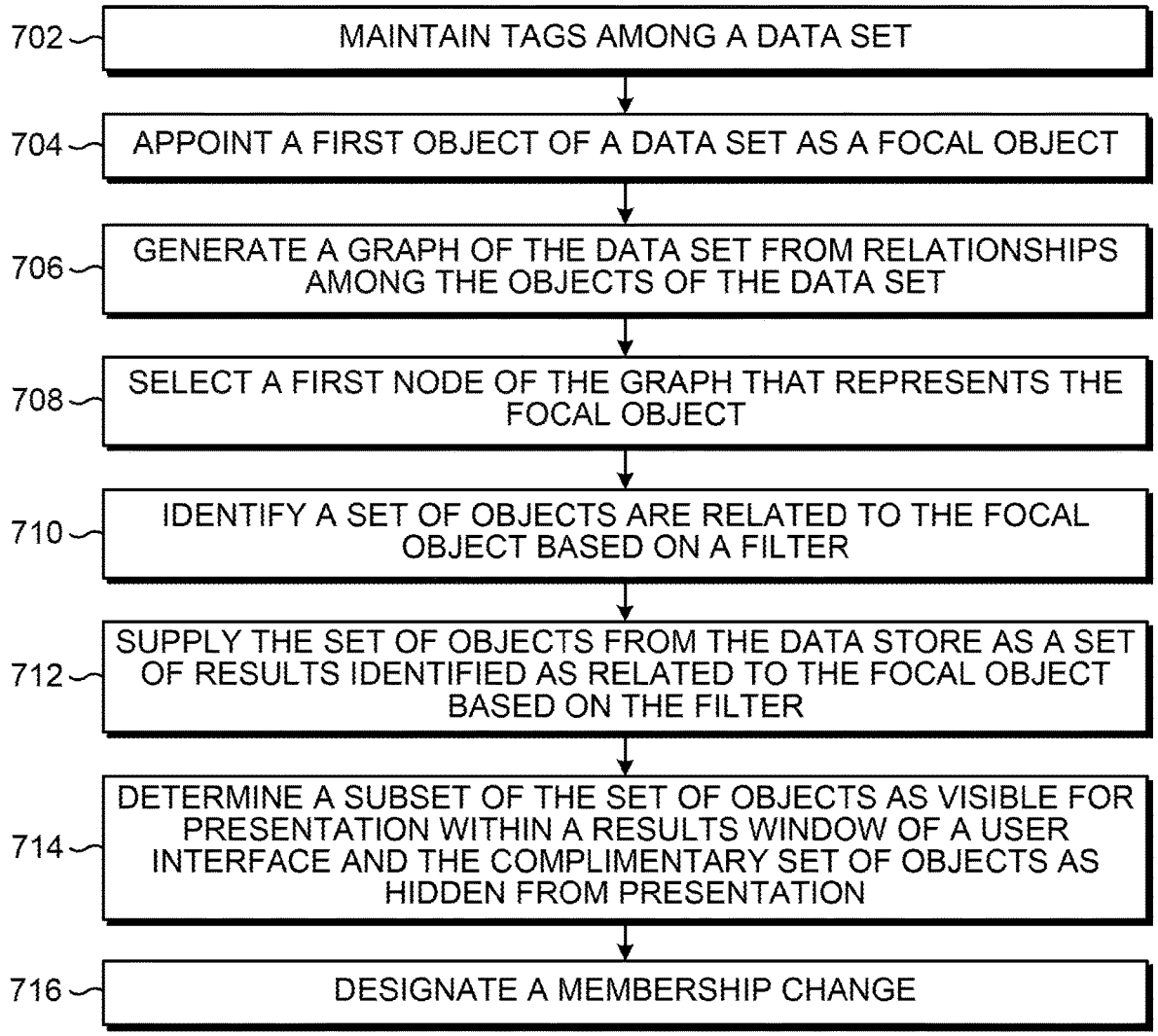
Figure 8:
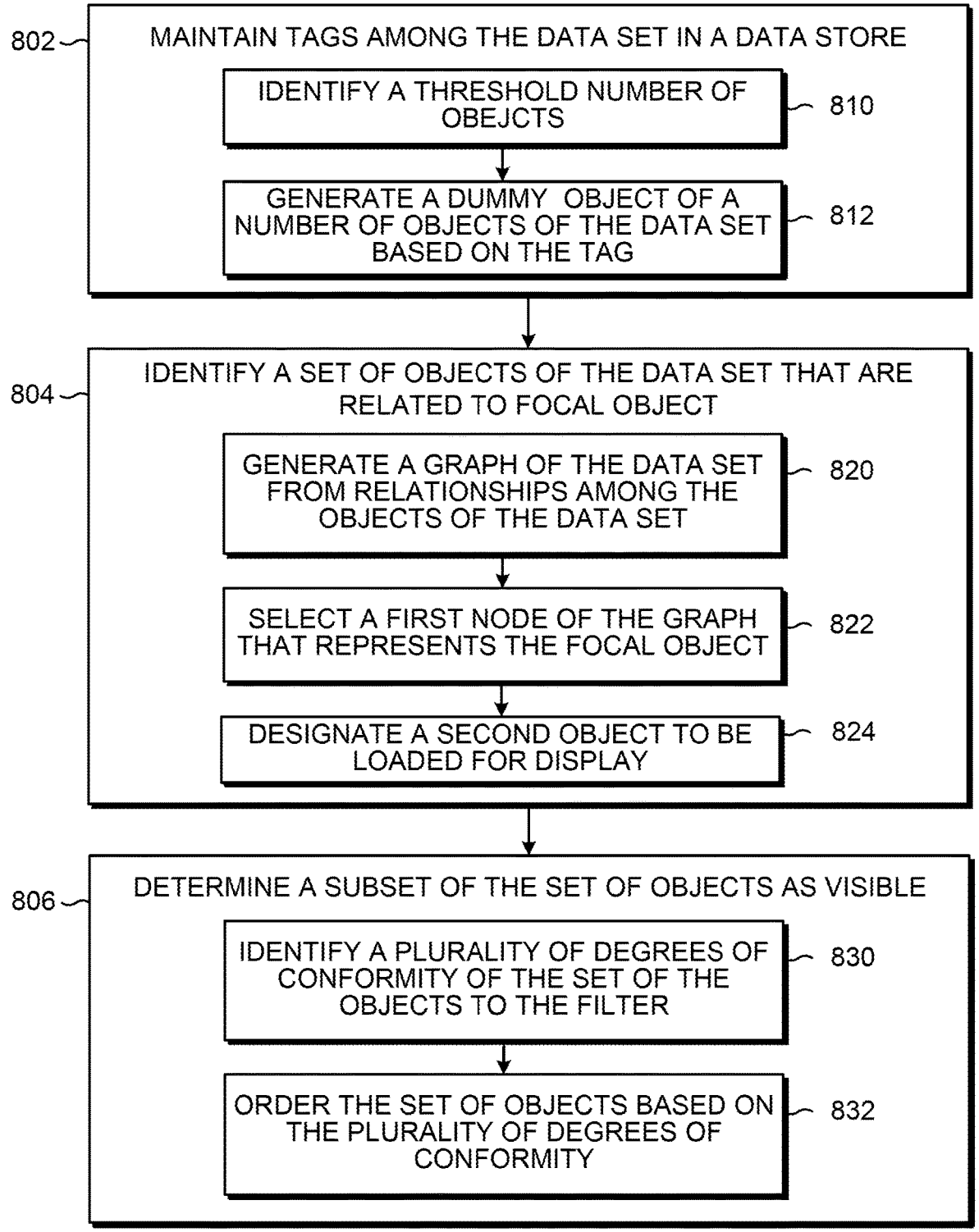

FIGS. 6-8 are flow diagrams depicting example methods for managing data. Referring to FIG. 6, example methods for managing data can generally comprise appointing an object of a data set as a focal object, identifying a set of objects of the data set that are related to the focal object based on a filter applied to the data set, and determining a subset of the set of objects as visible for presentation within a results window of a UI.

At block 602, a first object of a data set is appointed as a focal object. The first object can be appointed by a text search, a gesture on the UI, or an external mechanism in communication with the data management system via an API. At block 604, a set of objects that are related to the focal object are identified based on a filter. The objects of the data set can be associated with a plurality of tags and the filter can be a subset of the plurality of tags. The tags can be represented as edge connections of a graph of the data objects, and the determination of the set of objects can be based on following the edges of the focal object that represent the tags.

At block 606, a first subset of the set of objects can be determined as visible for presentation within a results window of a UI. In relation to that, a second subset of objects can be determined as hidden from presentation. The second subset can be a mathematical complement to the first subset where the second subset of the set of objects are hidden from presentation in the UI, but have been loaded for potential view. The visible objects can be designated by a flag or order recognized by the user device upon receipt of the list of objects. The objects designated as hidden can be at least partially loaded to allow for ready visibility by the user based on gestures on the UI.

FIG. 7 includes blocks similar to blocks of FIG. 6 and provides additional blocks and details. In particular, FIG. 6 depicts additional blocks and details generally regarding maintaining tags among the data set, generating a graph of the data set, and designating a membership change of the visible subset. Blocks 704, 710, and 714 are the same as blocks 602, 604, and 606 of FIG. 6 and, for brevity, their respective descriptions are not repeated.

At block 702, tags are maintained among the data set. As mentioned herein, the tags may be maintained automatically (such as by determining host groups), via a system of the data set, or manually by a user or system of the data set. A graph of the data set can be generated from the relationships among the objects of the data set represented by tags at block 706. The semi-structure of the data set can be utilized to generate a graph of nodes representing objects of the data set. Thus, when a focal object is selected at block 708, a first node representing the focal object can be investigated (e.g., discover a node connected to another node via an edge) for a second node that is related to the first node based on an edge connection representing a tag.

At block 712, the set of objects can be supplied from the data store to a user device and designated as a set of results identified as related to the focal object based on the filter. At block 716, the user can traverse the set of objects by designating an object to change membership from the hidden complementary set of supplied objects to the visible subset of objects and/or designating an object to change membership from the visible subset of objects to the hidden complementary set. The UI can update as the membership changes between the group of visible objects and the group of hidden objects.

FIG. 8 includes blocks similar to blocks of FIG. 7 and provides additional blocks and details. In particular, FIG. 7 depicts additional blocks and details generally regarding maintaining tags among the data set, identifying a set of objects related to the focal object, and determining a subset of the set of objects as visible. Blocks 802, 804, 806 are similar to blocks 702, 710, and 714 of FIG. 7 and, for brevity, their respective descriptions have not been repeated in their entirety.

At block 802, tags are maintained among the data set by identifying a threshold number of objects that are related at block 810 and, in response to the threshold being achieved, generating a host object (i.e., dummy object) of a number of objects of the data set based on the tag at block 812. For example, the number of objects are assigned to a first tag of a plurality of tags and the number is identifying as achieving a predetermined threshold, where the threshold may be predetermined based on the number at which creating an indirection in the data coupling provides for improved user intuition to walk through the semi-structured data. In that example, the number of objects can be designated as descendants of the focal objects when the host object is appointed as the focal object. In this manner, the host objects are to assist a user as the user explores the data by providing object groups in a hierarchy or other organizational form that may be instinctive and/or instructive to the user.

At block 804, a graph may be generated and utilized to identify a set of objects that are related to the focal object. At block 820, a graph of the data set is generated from relationships among the objects of the data set. For example, each object may be related to at least one other objects, as represented by an edge in the graph coupled to each related object. In this manner, the graph can represent a loose coupling of the objects based on the plurality of tags (e.g., string representations of the relationships). A first node of the graph that represents the focal object can be selected at block 822 in response to a gesture that causes the focal object to be appointed. At block 824, a second node is determined as related to the first node and the object associated with the second node can be designated to be loaded for display in the results window when the first node is selected and the second node passes the filter because the first node is connected to the second node on the graph and the object of the second node has at least one attribute prescribed by the filter.

At block 806, a subset of the objects are determined as visible. Visibility in the user window can be determined based on an order of the set of objects, which may, in turn, be based on the degree of conformity of the set of objects to the filter. For example, at block 830, a plurality of degrees of conformity of the set of objects to the filter are identified. The plurality of degrees of conformity may represent any degree of conformity between a range of no match of any tags of the filter to an exact match of all the tags of the filter. The conformity of an object of the filter can be based on a comparison of the tags of the filter to the tags (and/or attributes) of the objects. At block 832, the set of objects can be ordered based on the plurality of degrees of conformity. For example, the objects identified as having the highest degrees of conformity (e.g., highest number of tags matched when compared to the tags of the filter) can be placed at the beginning of an order of the set of objects (e.g., the visible subset) and the objects identified has having the least degrees of conformity (e.g., the lowest number of tags match when compared to the tags of the filter) can be placed at the end of the order. In this manner, the best matched results may be initially presented to the user to allow the user to quickly explore the most-related objects of the data set before exploring less-related objects of the data set.

CONCLUSION: Although the flow diagrams of FIGS. 5-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
a tag engine to maintain associations among objects of a data set, the associations among objects represented by tags coupled with the objects of the data set, wherein the data set is stored in a data store;
an associates engine to, in response to a selection of a first object of the data set as a focal object, identify a first set of objects having a first tag that matches a second tag coupled to the focal object;
a filter engine to, prior to presentation of any of the identified first set of objects in a user interface:
maintain a filter comprising a number of tags, the number of tags maintainable based on gesture input representing a change in location of one of the number of tags on the user interface;
order the identified first set of objects according to degrees of conformance with the filter; and
determine a first subset of the identified first set of objects as visible for presentation within the user interface, the first subset of the identified first set of objects being complementary to a second subset of objects of the identified first set of objects, wherein the second subset of objects is hidden from presentation in the user interface, wherein each object in the first subset of the identified first set of objects has a higher degree of conformance with the filter than each object in the second subset of objects; and
a load engine to, prior to presentation of any of the identified first set of objects in the user interface:
load the first subset of the identified first set of objects and the second subset of objects from the data store; and
transmit at least one of the first subset of the identified first set of objects and the second subset of objects from the load engine to a user device via a network connection.

2. The system of claim 1, wherein the data set is semi-structured, the system comprising:
a details engine to maintain a list of tags coupled with each object of the data set; and
a group engine to:
determine whether a number of objects associated with a third tag achieves a group threshold; and
in response to the group threshold being achieved, create a dummy object coupled with the third tag, the number of objects to be identified by the associates engine when the dummy object is designated as the focal object.

3. The system of claim 1, the load engine to attach a flag to each object of the first subset of the identified first of objects, wherein the flag indicates an object to be visible for presentation within the user interface.

4. The system of claim 1, comprising:
a bookmark engine to maintain a list of tags designated as saved for potential use with the filter.

5. The system of claim 1, wherein the load engine is to:
in response to a second gesture in the user interface:
cause a second object to change membership from the second subset of objects to the first subset of the identified first of objects, wherein the second object is caused to be visible in the user interface; and
cause a third object to change membership from the first subset of the identified first of objects to the second subset of objects, wherein the third object is caused to be hidden in the user interface.

6. The system of claim 1, wherein the selection of the first object as the focal object comprises a gesture moving the first object to a focal location of the user interface, wherein the focal location is a fixed location in the user interface.

7. A computer-readable storage medium comprising a set of instructions executable by a processor resource to:
- designate a first object as a focal object based on a first gesture, wherein the first object is selected from a plurality of objects in a data set, wherein the data set is stored in a data store;
- identify a set of objects related to the focal object based on a filter applied to the focal object, the filter comprising a set of tags associated with the identified set of objects;
- prior to presentation of any of the identified set of objects in a user interface:
  - order the identified set of objects according to degrees of conformance with the filter;
  - determine a first a subset of the identified set of objects to be visible for presentation in the user interface, the first subset of the identified set of objects being complementary to a second subset of the identified set of objects wherein the second subset of the identified set of objects is hidden from presentation in the user interface, wherein each object in the first subset of the identified set of objects has a higher degree of conformance with the filter than each object in the second subset of the identified set of objects;
  - load the first subset of the identified set of objects and the second subset of the identified set of objects from the data store into a load engine of a server; and
  - transmit, from the load engine of the server, at least one of the first subset of the identified set of objects and the second subset of the identified set of objects to a user device via a network connection.

8. The medium of claim 7, wherein the set of instructions is executable by the processor resource to:
- attach, by the load engine, a flag to each object of the first subset of the identified set of objects, wherein the flag indicates an object to be visible for presentation within the user interface.

9. The medium of claim 7, wherein:
the first gesture includes at least one of:
- a first drag-and-drop gesture to move the first object of the plurality of objects to a focal point location of the user interface; and
- a second drag-and-drop gesture to move a second object of a history of focal point objects from a history area of the user interface to a focal point location of the user interface.

10. The medium of claim 7, wherein the set of instructions is executable by the processor resource to:
- in response to a second gesture in the user interface:
  - cause a second object to change membership from the second subset of the identified set of objects to the first subset of the identified set of objects, wherein the second object is caused to be visible in the user interface; and
  - cause a third object to change membership from the first subset of the identified set of objects to the second subset of the identified set of objects, wherein the third object is caused to be hidden in the user interface.

11. The medium of claim 10, wherein the set of instructions is executable by the processor resource to:
- generate a dummy object based on a number of objects to achieve a group threshold, the dummy object to represent a parent node having the number of objects as descendants; and cause the number of objects to load for display when the dummy object is designated as the focal object.

12. The medium of claim 9, wherein the focal point location is a fixed location of the user interface.

13. The medium of claim 7, wherein the set of instructions is executable by the processor resource to:
- in response to a third gesture, designate a particular object of the first subset of the identified set of objects as a second focal object;
- identify a second set of objects related to the second focal object based on a filter applied to the second focal object;
- load the second set of objects from the data store; and
- present a subset of the second set of objects in the user interface.

14. A method for managing data comprising:
- appointing, in response to a first gesture in a user interface, a first object of a data set as a focal object, wherein the data set is stored in a data store;
- in response to appointing the first object as the focal object, identifying a set of objects of the data set that are related to the focal object and that match a filter applied to the data set, wherein the data set is associated with a plurality of tags, and wherein the filter comprises a subset of the plurality of tags;
- prior to presentation of any of the identified set of objects in the user interface:
  - ordering the identified set of objects according to degrees of conformance with the filter;
  - determining a first subset of the identified set of objects as visible for presentation within a results window of the user interface, the first subset of the identified set of objects being complementary to a second subset of the identified set of the objects that are hidden from presentation, wherein each object in the first subset of the identified set of objects has a higher degree of conformance with the filter than each object in the second subset of the identified set of objects;
  - loading the first subset of the identified set of objects and the second subset of the identified set of objects from the data store into a load engine of a server; and
  - transmitting, from the load engine of the server, at least one of the first subset of the identified set of objects and the second subset of the identified set of objects to a user device via a network connection.

15. The method of claim 14, comprising:
- in response to a second gesture in the user interface:
  - causing a second object to change membership from the second subset of the identified set of objects to the first subset of the identified set of objects, wherein the second object is caused to be visible in the user interface; and
  - causing a third object to change membership from the first subset of the identified set of objects to the second subset of the identified set of objects, wherein the third object is caused to be hidden in the user interface.

16. The method of claim 14, comprising:
- attaching, by the load engine, a flag to each object of the first subset of the identified set of objects, wherein the flag indicates an object to be visible for presentation within the user interface.

17. The method of claim 14, comprising: generating a dummy object based on a number of objects to achieve a group threshold, the dummy object to represent a parent node having the number of objects as descendants.

18. The method of claim 14, comprising:
- identifying a threshold number of objects assigned to a first tag of the plurality of tags is achieved;
- generating, in response to the threshold number of objects being achieved, a dummy object of a number of objects of the data set based on the first tag; and
- designating the number of objects as descendants when the dummy object is appointed as the focal object.

19. The method of claim 14, wherein appointing the first object of the data set as the focal object comprises moving, by the first gesture, the first object to a focal location of the user interface, wherein the focal location is a fixed location in the user interface.

20. The method of claim 14, comprising:
- appointing, in response to a third gesture, a second object of the first subset of the identified set of objects as a second focal object; and
- in response to appointing the second object as the second focal object, identifying a second set of objects of the data set that are related to the second focal object based on the filter applied to the data set.

* * * * *